United States Patent [19]

Yeo et al.

[11] Patent Number: 5,412,028
[45] Date of Patent: May 2, 1995

[54] THERMOPLASTIC RESIN COMPOSITION

[75] Inventors: Jong K. Yeo; Suk K. Chang; Eun H. Koo; Min H. Lee, all of Daejeon-si, Rep. of Korea

[73] Assignee: Lucky, Ltd., Seoul, Rep. of Korea

[21] Appl. No.: 142,103

[22] Filed: Oct. 28, 1993

[30] Foreign Application Priority Data

Apr. 13, 1988 [KR] Rep. of Korea ......... 88-4193

Related U.S. Application Data

[63] Continuation of Ser. No. 61,534, May 14, 1993, abandoned, which is a continuation of Ser. No. 650,195, Feb. 4, 1991, abandoned, which is a continuation-in-part of Ser. No. 335,376, Apr. 10, 1989, abandoned.

[51] Int. Cl.$^6$ .............. C08L 67/02; C08L 69/00; C08L 51/04; C08L 51/06
[52] U.S. Cl. .......................... 525/65; 525/67
[58] Field of Search .......................... 525/65

[56] References Cited

U.S. PATENT DOCUMENTS

| 4,034,013 | 7/1977 | Lane | 260/835 |
|---|---|---|---|
| 4,195,134 | 3/1980 | Coleman | 525/65 |
| 4,348,500 | 9/1982 | Robeson et al. | 525/65 |
| 4,666,972 | 5/1987 | Köhler et al. | 524/504 |
| 4,880,866 | 11/1989 | McNally et al. | 525/65 |

FOREIGN PATENT DOCUMENTS

| 33393 | 8/1981 | European Pat. Off. . | |
|---|---|---|---|
| 0180471 | 5/1986 | European Pat. Off. . | |
| 0197789 | 10/1986 | European Pat. Off. . | |
| 2348337 | 4/1974 | Germany . | |
| 2650870 | 5/1977 | Germany . | |
| 2901576 | 7/1980 | Germany . | |
| 3422862 | 1/1986 | Germany . | |
| 46-5225 | 2/1971 | Japan . | |
| 60-28446 | 2/1985 | Japan . | |
| 61-130366 | 6/1986 | Japan | 525/65 |
| 1400935 | 7/1975 | United Kingdom . | |
| 8604076 | 7/1986 | WIPO . | |

*Primary Examiner*—Robert E. Sellers
*Attorney, Agent, or Firm*—Birch, Stewart, Kolasch & Birch

[57] ABSTRACT

A thermoplastic resin composition comprising polybutylene terephthalate, a core-shell type copolymer, a multifunctional epoxy resin and a catalyst. The composition has excellent impact resistance and mechanical strength, and is capable of being processed by blow molding.

6 Claims, 1 Drawing Sheet

THERMOPLASTIC RESIN COMPOSITION

This application is a continuation of application Ser. No. 08/061,534 filed on May 14, 1993, now abandoned, which is a continuation of Ser. No. 07/650,195, filed Feb. 4, 1991, now abandoned, which is a Continuation-in-Part of Ser. No. 07/335,376, filed on Apr. 10, 1989, now abandoned.

FIELD OF THE INVENTION

The present invention relates to a novel thermoplastic polyester composition having excellent impact resistance, mechanical strength, and which is capable of being processed by blow molding. More particularly, the present invention relates to a thermoplastic resin composition comprising polybutylene terephthalate, a core-shell type copolymer, a multifunctional epoxy resin, a catalyst and polycarbonate.

BACKGROUND OF THE INVENTION

The utility of thermoplastic polyesters in engineering type applications is limited where toughness and high impact strength are required. The impact strength of unmodified thermoplastic polyesters is too low for many applications especially at a temperature below the glass transition temperature (hereinafter it is Tg) of the polyester used.

The improvement of the toughness and impact strength of thermoplastic polyester has been the subject of considerable research and development by those who are highly skilled in the art. Much of such earlier research and development has been directed to the admixture of additives with the polyester, with particular attention being given to the addition of rubber-like or elastomeric materials, such as ethylene-propylene copolymer (EPM) or ethylene propyleneterpolymer (EPDM) to improve impact strength and toughness without interfering with the other desirable properties of the polyester. However, the desired level of improvement has not been achieved with the addition of such rubber-like or elastomeric materials because of the relative incompatibility between such rubber-like or elastomeric materials and polyester resins.

Therefore, in order to overcome these problems there has been a number of studies made for increasing the compatibility between polyesters and rubber-like materials, such as by the grafting of functional groups thereon or by increasing the molecular weight of the polyester whose groups are modified by a chemical reaction such as branching and crosslinking.

In order to improve the impact resistance, methods modifying with only elastomers such as EPR(ethylene-propylene copolymer) or PIB(polyisobutylene) are disclosed in JP Patent Publication No. 71-5225; DE Patent Nos. 2,348,337; 2,650,870; and 2,901,576; U.S. Pat. Nos. 4,393,153; 4,180,494; 4,096,202; and 4,034,013. Also, methods for modifying elastomers by introducing functional groups to increase the compatibility between polyester and elastomers are disclosed in JP Patent laid-open No. 85-28446, European Patent No. 33393 and PCT International Publication No. 8604076.

As a method for modifying the polyester as a matrix resin, European Patent No. 180471 discloses a method improving impact resistance by adding an epoxy resin of DGEBA (diglycidyl ether bisphenol A) type which is reacted at the end groups of polybutylene terephthalate (PBT). In cases in which a DGEBA-type epoxy is used, the branching or crosslinking effect of the epoxy is inferior to that of the multifunctional epoxy resin having three or more oxirane groups. This would result in the blow moldability capability, which is a criteria for judging the relative ease of moldability. The blow moldability is defined as the ratio of the intrinsic viscosities of a resin at 0.1 rad/sec of shearing velocity and at 100 rad/sec of shearing velocity, that is $R^* = \eta(R=0.1)/\eta(r-100)$. As shown in appending figure, using bisphenol type difunctional epoxy (2) increases only the viscosity, according to increasing molecular weight, while remarkably, the increasing of $R^*$ as well as the viscosity, results from the use of multifunctional epoxy (1), and thus good blow moldability is also obtained.

The reaction mechanism on said reaction effect is as follows. Reaction mechanism (I) represents reacting difunctional epoxy resin having bisphenol groups (Epirez 510) with PBT resin. The following reaction mechanism (II) represents reacting multifunctional epoxy resin (Epiclon N665) with PBT resin.

Reaction Mechanism (I)

PBT resin/Difunctional epoxy resin having bisphenol group (Epirez 510)/Catalyst

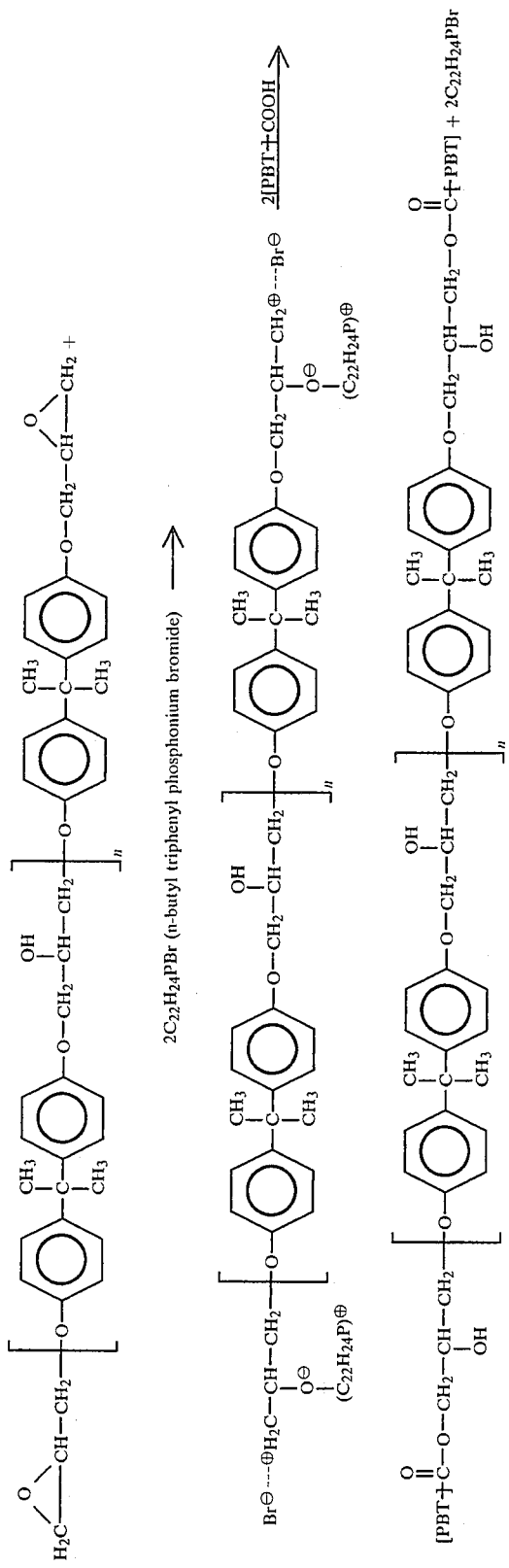

Reaction Mechanism (II)

PBT resin/multifunctional epoxy resin (Epiclon N665)/catalyst

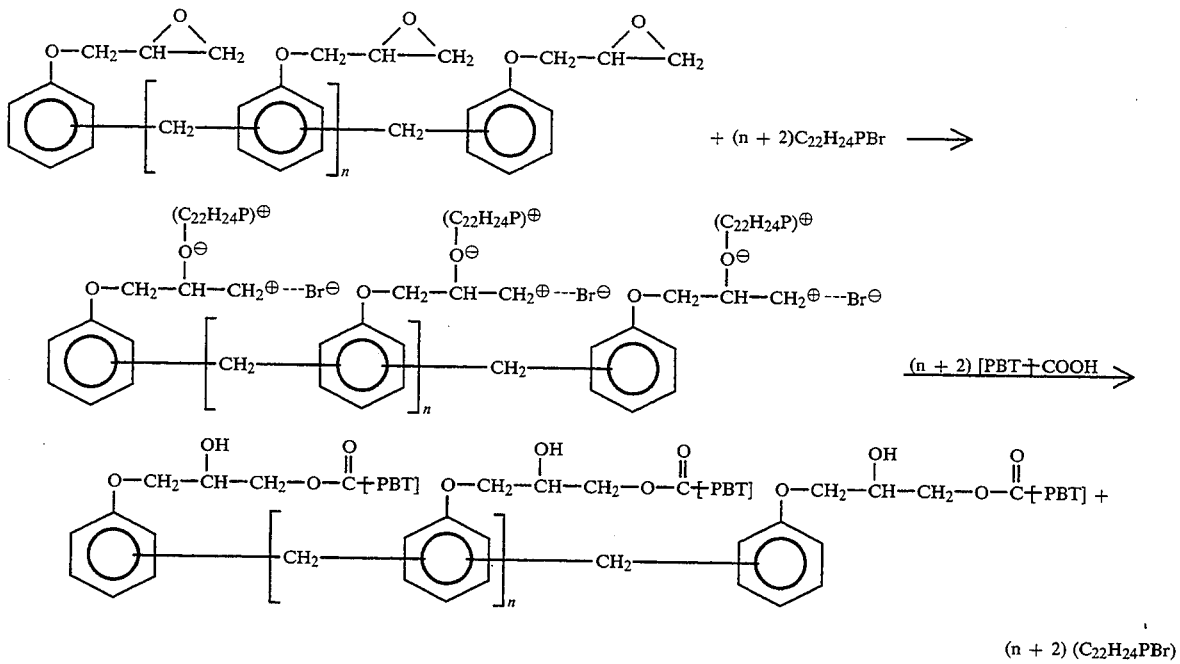

As shown by the above reaction mechanisms, reaction mechanism (I) leads only to an increase in the molecular weight of the PBT resin, while on the other hand, the reaction mechanism (II) further has an advantageous viscosity behavior in blow molding because of the branching or crosslinking effect of the PBT resin.

In other words, according to reaction mechanism (I), the Epirez 510 having only the two functional epoxy end groups, can only react with two molecules of the [PBT] COOH resin, which would result only in an extension of its linear chain structure and a corresponding increase in the molecular weight thereof. Whereas in the case of reaction mechanism (II), the Epiclon N665 having multifunctional epoxy groups, can react with a plurality of [PBT]COOH molecules, which transforms its structure into a branchable or crosslinkable non-linear molecular chain, such that it represents an advantageous viscosity behavior in blow molding.

As methods for improving impact resistance by crosslinking matrix resin, DE Patent laid-open No. 3,422,862 discloses a method of physically cross-linking with PTFE (polytetrafluoroethylene) and European Patent No. 197789 discloses a method of chemically reacting by using functional groups of PCB(polycarbodiimide). But, these methods have problems in injection molding since the processability is sensitively dependent on a degree of the cross-linking.

SUMMARY OF THE INVENTION

The object of the present invention is to provide a thermoplastic resin composition comprising a coreshell type copolymer prepared by grafting one or more unsaturated compounds to a core component formed by polymerizing one or more rubber components selected from the group consisting of acrylic rubbers and diene type rubbers, a polyester resin, a multifunctional epoxy having three or more oxirane groups as a modifier of the polyester resin, a catalyst and polycarbonate having improved mechanical strength and impact strength, and which is capable of being processed by blow molding.

DETAILED DESCRIPTION OF A PREFERRED EMBODIMENT

Figure 1:
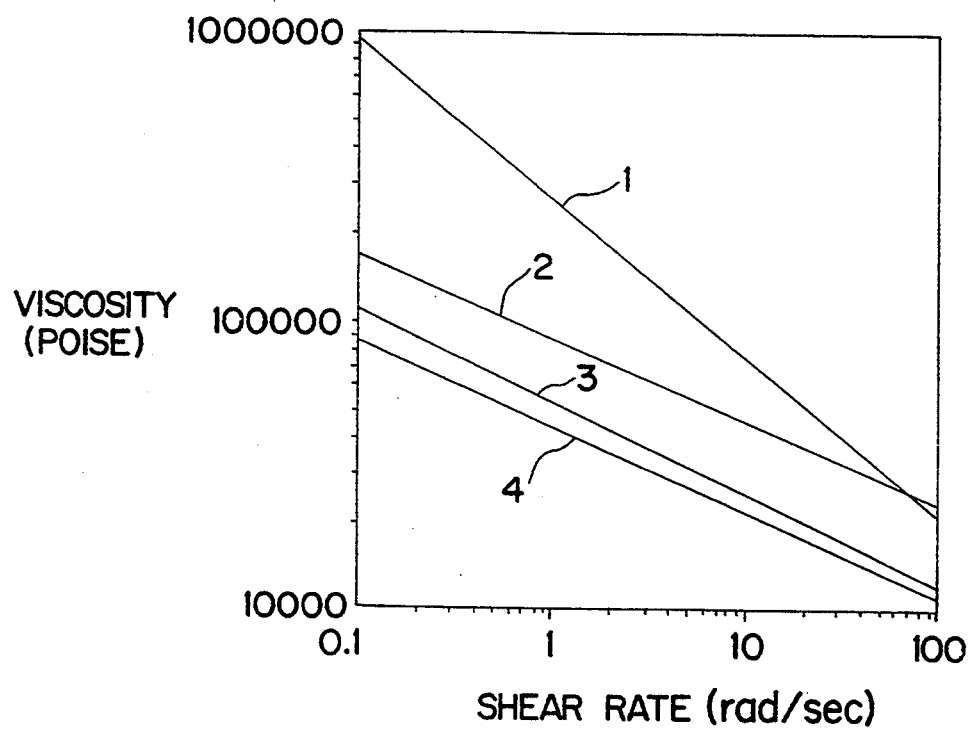
FIG. 1 is a graph which shows shearing velocity-viscosity behavior.

The present invention relates to a thermoplastic resin composition comprising (1) 40 to 95 parts by weight of polybutylene terephthalate;

(2) 5 to 55 parts by weight of a core-shell type copolymer which is formed from 20 to 90% by weight of one or more rubber components selected from the group consisting of acrylic rubbers and diene type rubbers and 80 to 10% by weight of one or more unsaturated compounds capable of being grafted to the rubber components;

(3) 0.1 to 5 parts by weight of multifunctional epoxy resin having three or more oxirane groups;

(4) 0.001 to 3.0 parts by weight of a Lewis catalyst; and (5) 1 to 90 parts by weight of bisphenol A polycarbonate resin.

As the polybutylene terephthalate of the component (1) according to the present invention, one whose intrinsic viscosity measured by using ortho chlorophenol as a solvent at 25° C. is 0.5 to 1.4 dl/g, is used. The polybutylene terephthalate is used in an amount of 40 to 95 parts by weight. When the amount of the polybutylene terephthalate used is less than 40 parts by weight, its mechanical strength is not sufficiently high.

The core-shell copolymer of the component (2) according to the present invention may be prepared by the conventional method of polymerizing one or more rubber components selected from the group consisting of 2 to 8 carbon atoms of acrylic rubbers and 3 to 6 carbon atoms of diene type rubbers to obtain a core component, and copolymerizing the core component with one or more unsaturated compounds capable of being grafted as a shell component. The content of the rubber components is 20 to 90% by weight, preferably 40 to 80% by weight. When the content of the rubber component is less than 20% by weight, the impact-strengthening effect is decreased, and when the content is more than 90% by weight, preparation of the elastomer by conventional emulsion polymerization is difficult.

Said rubber components are selected from the group consisting of butyl acrylate, 2-ethyl hexyl acrylate and butadiene, and said unsaturated compounds capable of being grafted are selected from the group consisting of methyl methacrylate, styrene, acrylonitrile, butyl methacrylate and glycidyl methacrylate.

The core-shell copolymer is used in an amount of 5 to 55 parts by weight.

In the present invention, the multifunctional epoxy resin of the component (3) is used as a modifier of the polyester resin, a matrix resin, which is a compound having three or more oxirane groups represented by the following formula (I):

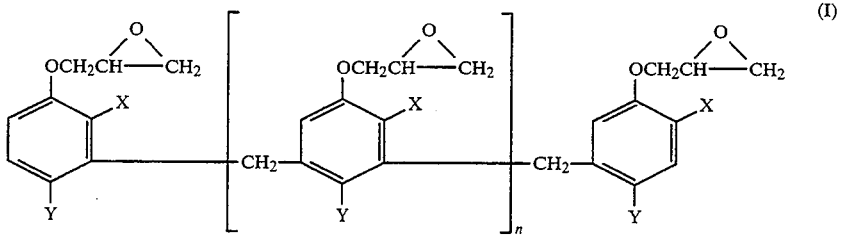

wherein,
X is hydrogen or methyl group,
Y is hydrogen, bromine or hydroxy group, and
n is 3, 4, 5, 6 or 7.

Said epoxy resin of the above formula (I) may be prepared by reacting epichlorohydrin with formaldehyde novolac.

The multifunctional epoxy resin is used in an amount of 0.1 to 5 parts by weight, preferably 0.1 to 2 parts by weight. When the amount used is more than 5 parts by weight, the processability is decreased due to over cross-linking of the polyester, and when the amount used is less than 0.1 parts by weight, the effect on modifying the matrix resin is insufficient.

For accelerating the reaction of the multifunctional epoxy resin of the above formula (I), the Lewis catalyst such as triphenyl phosphine, alkyl triphenyl halide, methyl bistriphenyl or phosphonium dibromide may be used in a small amount preferably 0.001 to 3 parts by weight.

The bisphenol A polycarbonate resin of the component (5) used in the present invention is one whose average molecular weight is at least 20,000. Such a bisphenol A polycarbonate resin has functions such as the harmonization and the improvement of impact strength at low temperature. The polycarbonate is used in an amount of 1 to 90 parts by weight, preferably 5 to 55 parts by weight, and when using less 1 part by weight, the improvement of the material properties is insufficient, and when using over 50 parts by weight, the effect from epoxy and catalyst accented in the present invention was insufficient.

The polyester resin composition according to the present invention can be prepared by a conventional melt-blending method such as Banbury mixing, milling or extrusion.

If necessary, dyes, releasing agents, heat-stabilizers, lubricants or/and flame retardants or/and blowing agents may be added, and glass fibers or/and inorganic fillers may be also added in order to increase the mechanical strength.

The present invention will be further described in detail with examples given below. It should be noted that the invention is not limited to the examples. In the examples, parts means parts by weight.

EXAMPLE 1

87.5 parts of polybutylene terephthalate (intrinsic viscosity: 1.0 dl/g), 12.5 parts of MBS as a core-shell copolymer and 0.5 parts of Epiclon N665 (product of DAINIPPON INKI SHA, a multifunctional epoxy resin of cresol type) as an epoxy resin were blended with Buss Kneader whose barrel temperature was adjusted to 240°~260° C., to form pellets.

After the test sample of ASTM standards was prepared by injection molding, the material properties were measured. The results are shown in Table I below.

EXAMPLE 2

After preparing a test sample in accordance with the same procedure as in Example 1 but using 0.75 parts of Epiclon N665 as an epoxy resin, the material properties were measured. The results are shown in Table I below.

EXAMPLE 3

After preparing a test sample in accordance with the same procedure as in Example but using 1.0 part of Epiclon N665 as an epoxy resin, the material properties were measured. The results are shown in Table I below.

EXAMPLE 4

After preparing a test sample in accordance with the same procedure as in Example 1 but using 0.5 parts of Epiclon N775 (product of DAINIPPON INKI SHA, a multifunctional epoxy resin of phenol type) as an epoxy resin, the material properties were measured. The results are shown in Table I below.

EXAMPLE 5

After preparing a test sample in accordance with the same procedure as in Example 1 but using 0.5 parts of Epiclon 152 (product of DAINIPPON INKI SHA, a multifunctional epoxy resin of novolac type having bromine groups) as an epoxy resin, the material properties were measured. The results are shown in Table I below.

EXAMPLE 6

After preparing a test sample in accordance with the same procedure as in Example 1 but using 82.5 parts of polybutylene terephthalate and using 17.5 parts of KM 330 (product of ROHM & HASS CO., an acrylic elastic copolymer) as a core-shell type copolymer, the material properties were measured. The results are shown in Table I below.

EXAMPLE 7

After preparing a test sample in accordance with the same procedure as in Example 1 but using 85.0 parts PBT resin, 15.6 parts MBS, 0.5 parts of Epiclon N665 and 0.025 parts n-butyl triphenyl phosphonium bromide as a catalyst, shearing velocity-viscosity behavior was measured by using Rheometrics Mechanical spectrometer (RMS, 250° C). The results are shown in Table 1 and FIG. 1. Example 7 corresponds to No. 1 in FIG. 1.

EXAMPLE 8

After preparing a test sample in accordance with the same procedure as in Example 1, but using 65.0 parts PBT resin, 15 parts of MBS, 0.5 parts of Epiclon N665, 0.025 parts of n-butyl triphenyl phosphonium bromide and 20 parts of bisphenol A polycarbonate (Panlite K-1300 marked by Teijin Co), the shearing velocity-viscosity behavior was measured by using Rheometrics Mechanical spectrometer (RMS, 250° C). The results are shown in Table 1.

Comparative Example 1

After preparing a test sample in accordance with the same procedure as in Example 1 but not using epoxy resin, the material properties were measured. The results are shown in Table I below.

Comparative Example 2

After preparing a test sample in accordance with the same procedure as in Example 1 but using 0.5 parts of Epirez 510 (product of SERANISE CO. an epoxy resin having bisphenol groups) instead of a multifunctional epoxy resin, the material properties were measured. The results are shown in Table I below.

Comparative Example 3

After preparing a test sample in accordance with the same procedure as in Example 1 but using 82.5 parts of polybutylene terephthalate, using 17.5 parts of KM 330 as a core-shell type copolymer and using no epoxy resin, the material properties were measured. The results are shown in Table I below.

Comparative Example 4

After preparing a test sample in accordance with the same procedure as in Example 1 but using 85.0 parts of PBT resin and 15.0 parts of MBS, the material properties were measured by using RMS as in Example 7. The results are shown in Table 1 and FIG. 1. Comparative Example 4 corresponds to No. 4 in FIG. 1.

Comparative Example 5

After preparing a test sample in accordance with the same procedure as in Example 4 but using 0.5 parts of Epirez 510 having bisphenol group and 0.5 parts of Epiclon N665, the material properties were measured. The results are shown in Table 1 and FIG. 1. Comparative Example 5 corresponds to No. 3 in FIG. 1.

Comparative Example 6

After preparing a test sample in accordance with the same procedure as in Example 7 but using 0.5 parts of Epirez 510 instead of 0.5 parts of Epiclon, the material properties were measured. The results are shown in Table 1 and FIG. 1. comparative Example 6 corresponds to No. 2 in FIG. 1.

Comparative Example 7

After preparing a test sample in accordance with the same procedure as in Example 8 but not using Epiclon N665 and n-butyl phosphonium bromide, the material properties were measured. The results are shown in Table 1.

TABLE 1

| Composition | \multicolumn{8}{c|}{Examples} |
|---|---|---|---|---|---|---|---|---|
| | 1 | 2 | 3 | 4 | 5 | 6 | 7 | 8 |
| PBT | 87.5 | 87.5 | 87.5 | 87.5 | 87.5 | 82.5 | 85 | 65 |
| MBS | 12.5 | 12.5 | 12.5 | 12.5 | 12.5 | | 15 | 15 |
| KM 330 | | | | | | 17.5 | | |
| Epiclon N665 (cresol) | 0.5 | 0.75 | 1 | | | 0.5 | 0.5 | 0.5 |
| Epiclon N775 (phenol) | | | | 0.5 | | | | |
| Epiclon N152 (Novolak) | | | | | 0.5 | | | |
| Epirez 510 | | | | | | | | |
| n-butyl triphenyl phosphonium bromide | | | | | | | 0.25 | 0.25 |
| polycarbonate | | | | | | | | 20 |
| Material Properties | | | | | | | | |
| Impact Strength ASTM D256 (kgcm/cm) | 92.8 | 113 | 130 | 90 | 87 | 85 | 93 | 115 |
| Flexural modulus ASTM D790 (kg/cm) | 21800 | 20800 | 20100 | 21500 | 20700 | 20500 | 22000 | 22500 |
| Melt flow index 2160 g, 250° C. | 6.3 | 5.9 | 5.5 | 6.5 | 6.4 | 5.0 | 2.5 | 2.5 |
| Blow moldability R* | 9.0 | 9.4 | 10.2 | 8.7 | 9.5 | 12.0 | 35.4 | 35 |

TABLE 1-continued

| Composition | Comparative Examples | | | | | | |
|---|---|---|---|---|---|---|---|
| | 1 | 2 | 3 | 4 | 5 | 6 | 7 |
| PBT | 87.5 | 87.5 | 82.5 | 85 | 85 | 85 | 65 |
| MBS | 12.5 | 12.5 | | 15 | 15 | 15 | 15 |
| KM 330 | | | 17.5 | | | | |
| Epiclon N665 (cresol) | | | | | | | |
| Epiclon N775 (phenol) | | | | | | | |
| Epiclon N152 (Novolak) | | | | | | | |
| Epirez 510 | | 0.5 | | | 0.5 | 0.5 | |
| n-butyl triphenyl phosphonium bromide | | | | | | | 0.25 |
| poly-carbonate | | | | | | | 20 |
| MaterialProperties | | | | | | | |
| Impact Strength ASTM D256 (kgcm/cm) | 20 | 72 | 15 | 25 | 75 | 75 | 98 |
| Flexural modulus ASTM D790 (kg/cm) | 15900 | 18500 | 15700 | 15000 | 19000 | 19000 | 19800 |
| Melt flow index 2160 g, 250° C. | 10.3 | 4.0 | 6.0 | 8.0 | 3.8 | 3.0 | 5.0 |
| Blow moldability R* | 7.5 | 8.5 | 10.0 | 8.0 | 9.2 | 8.2 | 11.0 |

Particularly, as shown in Table 1 and FIG. 1, the composition of Example 7 has greater blow moldability than those of the Comparative Examples, which did not use a catalyst or a bisphenol-type difunctional epoxy or did not use either of the two.

We claim:

1. A thermoplastic resin composition consisting essentially of
   (1) 40 to 95 parts by weight of polybutylene terephthalate;
   (2) 5 to 55 parts by weight of a core-shell copolymer which is comprised of from 20 to 90% by weight of one or more rubber components selected from the group consisting of acrylic rubbers and diene rubbers having 80 to 10% by weight of one or more unsaturated compounds grafted thereon;
   (3) 0.1 to 5 parts by weight of a multifunctional novolak epoxy resin having three or more oxirane groups;
   (4) 0.001 to 3.0 parts by weight of a Lewis catalyst; and
   (5) 1 to 90 parts by weight of a bisphenol A polycarbonate resin.

2. The thermoplastic resin composition as claimed in claim 1, in which the intrinsic viscosity of the polybutylene terephthalate as measured by using ortho chlorophenol as a solvent at 25° C. is 0.5 to 1.4 dl/g.

3. The thermoplastic resin composition as claimed in claim 1, in which the rubber components are each selected from a butyl acrylate rubber, a butadiene rubber or a 2-ethyl hexyl acrylate rubber.

4. The thermoplastic resin composition as claimed in claim 1, in which the one or more unsaturated compounds are each methyl methacrylate, styrene, acrylonitrile, butyl methacrylate or glycidyl methacrylate.

5. The thermoplastic resin composition as claimed in claim 1, in which the multifunctional novolak epoxy resin is prepared by reacting epichlorohydrin with formaldehyde novolac and is represented by formula (I):

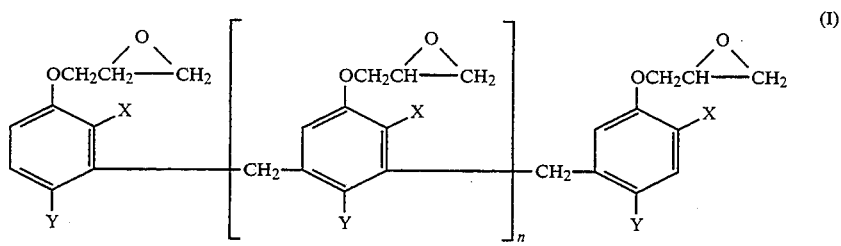

wherein,
X is hydrogen or methyl group,
Y is hydrogen, bromine or hydroxy group, and
n is 3, 4, 5, 6 or 7.

6. The thermoplastic resin composition as claimed in claim 1, in which the Lewis catalyst is an alkyl triphenyl phosphonium halide, an alkenyl triphenyl phosphonium halide or a tetraphenylphosphonium borate.

* * * * *